(12) United States Patent
Oki et al.

(10) Patent No.: US 8,426,064 B2
(45) Date of Patent: Apr. 23, 2013

(54) COMPOSITE MATERIAL FOR POSITIVE ELECTRODE OF LITHIUM BATTERY

(75) Inventors: Kazuo Oki, Wakayama (JP); Minoru Sawai, Wakayama (JP); Hiroaki Kitayama, Wakayama (JP); Takamitsu Saito, Kawasaki (JP); Tamaki Miura, Yamata (JP); Kyoichi Watanabe, Ebina (JP)

(73) Assignee: Kao Corporation, Tokyo (JP)

( * ) Notice: Subject to any disclaimer, the term of this patent is extended or adjusted under 35 U.S.C. 154(b) by 255 days.

(21) Appl. No.: 12/745,873

(22) PCT Filed: Dec. 3, 2008

(86) PCT No.: PCT/JP2008/071958
§ 371 (c)(1),
(2), (4) Date: Jun. 2, 2010

(87) PCT Pub. No.: WO2009/081704
PCT Pub. Date: Jul. 2, 2009

(65) Prior Publication Data
US 2010/0248034 A1    Sep. 30, 2010

(30) Foreign Application Priority Data

Dec. 25, 2007  (JP) ................................. 2007-332579
Dec. 25, 2007  (JP) ................................. 2007-332650

(51) Int. Cl.
*H01M 4/04* (2006.01)

(52) U.S. Cl.
USPC .......................................................... 429/212

(58) Field of Classification Search .......................... None
See application file for complete search history.

(56) References Cited

U.S. PATENT DOCUMENTS

2006/0141361 A1* 6/2006 Yuasa et al. .................... 429/232
2006/0222952 A1* 10/2006 Kono et al. .............. 429/231.95
(Continued)

FOREIGN PATENT DOCUMENTS

CN    101103485 A    1/2008
CN    101410915 A    4/2009
(Continued)

OTHER PUBLICATIONS

English translation of International Preliminary Report on Patentability (Forms PCT/IB/338 and PCT/IB/373) and of Written Opinion of the International Searching Authority (Form PCT/ISA/237) issued on Jul. 20, 2010.

(Continued)

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

The present invention provides a composite material for positive electrodes of lithium batteries, which provides a lithium battery having excellent high rate electrical discharge characteristics, has a sufficiently secured diffusion passage for Li, and has high conductivity, a process for producing the same, as well as a positive electrode and a battery using the composite material for positive electrodes of lithium batteries. The present invention relates to a composite material for positive electrodes of lithium batteries, comprising composite particles containing positive electrode active material particles and fibrous carbons, wherein the composite particles have a form in which the positive electrode active material particles are supported by the fibrous carbons.

10 Claims, 2 Drawing Sheets

U.S. PATENT DOCUMENTS

| | | | |
|---|---|---|---|
| 2006/0240274 A1* | 10/2006 | Ohmura et al. | 428/635 |
| 2007/0048619 A1* | 3/2007 | Inda | 429/322 |
| 2007/0195125 A1 | 8/2007 | Saito et al. | |
| 2009/0220678 A1 | 9/2009 | Kono et al. | |
| 2009/0267028 A1 | 10/2009 | Hoshiba | |
| 2011/0151313 A1 | 6/2011 | Saito et al. | |

FOREIGN PATENT DOCUMENTS

| | | |
|---|---|---|
| EP | 2 034 542 A1 | 3/2009 |
| JP | 10-162811 A | 6/1998 |
| JP | 11-283629 A | 10/1999 |
| JP | 2003-173777 A | 6/2003 |
| JP | 2005-158721 A | 6/2005 |
| JP | 2006-134777 A | 5/2006 |
| JP | 2006-164859 A | 6/2006 |
| JP | 2006-172821 A | 6/2006 |
| JP | 2006-302617 A | 11/2006 |
| JP | 2006-310628 A | 11/2006 |
| JP | 2007-48692 A | 2/2007 |
| JP | 2007-109631 A | 4/2007 |
| JP | 2007-273639 A | 10/2007 |
| JP | 2008-117749 A | 5/2008 |
| WO | WO 2006/059794 A2 | 6/2006 |

OTHER PUBLICATIONS

Supplementary European Search Report for corresponding European Patent Application No. 08863456.3, mailed on Dec. 28, 2011.

Notification of the First Office Action for corresponding Chinese Patent Application No. 200880122565.1, dated Dec. 6, 2012.

Information Statement for corresponding Japanese Patent Application No. 2008-308870, dated Jan. 15, 2013.

Submission of Information for corresponding Japanese Patent Application No. 2008-308849, dated Jan. 15, 2013.

* cited by examiner

COMPOSITE MATERIAL FOR POSITIVE ELECTRODE OF LITHIUM BATTERY

TECHNICAL FIELD

The present invention relates to a composite material for positive electrodes of lithium batteries, which includes composite particles containing positive electrode active material particles and fibrous carbons, a process for producing the same, as well as a positive electrode and a battery using the composite material for positive electrodes of lithium batteries.

BACKGROUND ART

In recent years, researches have been carried out in order to introduce electric vehicles, hybrid vehicles and fuel cell vehicles due to the rising price of petroleum resources and rising global earth environment protection movement. Batteries as an auxiliary power are essential for these driving systems. In addition, high output batteries capable of responding to the sudden starting and sudden acceleration of vehicles have been desired. Further, batteries having high energy density are desired from the viewpoints of weight load to the vehicles and enhancement in fuel consumption. Because of these factors, lithium ion secondary batteries having highest energy density and capable of expressing high output have been highly expected among secondary batteries.

Generally, a lithium ion secondary battery has electrodes composed of a positive electrode containing a lithium ion-containing oxide and a negative electrode containing a carbon material. Since the conductivity of the lithium ion-containing oxide (positive electrode active material) itself is low in the positive electrode, conductive materials such as carbon black, a carbon fiber and the like are added in order to enhance the conductivity. In recent years, VGCF (registered trademark) having a fiber diameter of nanometer order, which is obtained by a gas phase process, and a carbon nanotube have been developed for the carbon fiber. The application of the carbon fiber to batteries has been considered.

For example, Patent Document 1 discloses an example in which a positive electrode active material, a carbon nanotube, graphite and a binder are mixed to form a paste, and the paste is applied to produce a positive electrode.

Patent Document 2 discloses a technique for mixing a spherical positive electrode active material having a particle diameter of 5 to 30 μm and a carbon nanofiber while mechanically applying a strong shearing force thereto by a centrifugal ball mill, dividing the carbon nanofiber and making the divided carbon nanofiber adhere to the surface of the active material.

Furthermore, Patent Document 3 discloses a process for producing a composite material for positive electrodes of lithium batteries in which a positive electrode active material obtained by mixing and calcining a transition metal compound and a lithium compound, and a conductive auxiliary agent such as carbon powder are spray-dried to be formed into a composite material.

Patent Document 1: Japanese Patent Application Laid-Open No. 11-283629
Patent Document 2: Japanese Patent Application Laid-Open No. 2006-164859
Patent Document 3: Japanese Patent Application Laid-Open No. 2003-173777

DISCLOSURE OF THE INVENTION

Problems to be Solved by the Invention

However, fibrous carbons such as carbon nanotubes are mutually entangled to be formed into a ball-like state. Therefore, it is very difficult for the mixing process described in Patent Document 1 to loosen the fibrous carbons and to uniformly mix the fibrous carbons with a positive electrode active material, and the carbon nanotube cannot sufficiently exert its potential.

As disclosed in Patent Document 2, the process for mixing a positive electrode active material and a carbon nanofiber while mechanically applying a strong shearing force thereto by a centrifugal ball mill divides the carbon nanofiber. Therefore, this division inhibits a long-distance conductive path generated by a high aspect ratio as the feature of the carbon nanofiber.

Furthermore, it is difficult for the process for producing a composite material for positive electrodes described in Patent Document 3 to uniformly mix fibrous carbons with a positive electrode active material in preparing the slurry used for spray drying. Therefore, it is difficult to use the fibrous carbons in place of carbon powder, as a conductive auxiliary agent in the production process.

Accordingly, the present invention provides a composite material for positive electrodes of lithium batteries, which provides a lithium battery having excellent high rate electrical discharge characteristics, has a sufficiently secured diffusion passage for Li, and has high conductivity, a process for producing the same, as well as a positive electrode and a battery using the composite material for positive electrodes of lithium batteries.

Means for Solving the Problems

The present inventors have found that a slurry containing a solvent, and positive electrode active material particles and fibrous carbons sufficiently dispersed in the solvent is subjected to spray granulation to obtain granules in which the positive electrode active material particles are supported by the fibrous carbons, and the granules serve as a composite material for positive electrodes having excellent high rate electrical discharge characteristics, and have accomplished the present invention.

That is, the present invention relates to a composite material for positive electrodes of lithium batteries, comprising composite particles containing positive electrode active material particles and fibrous carbons, wherein the composite particles have a form in which the positive electrode active material particles are supported by the fibrous carbons.

Furthermore, the present invention relates to a positive electrode and a battery using the composite material for positive electrodes of lithium batteries of the present invention.

Furthermore, the present invention relates to a process for producing a composite material for positive electrodes of lithium batteries, which comprises composite particles containing positive electrode active material particles and fibrous carbons, the process including: Step 1 of obtaining a slurry containing a solvent, and the positive electrode active material particles and the fibrous carbons contained in a dispersed state in the solvent; and Step 2 of subjecting the slurry obtained in Step 1 to spray granulation to obtain granules containing the positive electrode active material particles and the fibrous carbons.

BEST MODE FOR CARRYING OUT THE INVENTION

Figure 1:
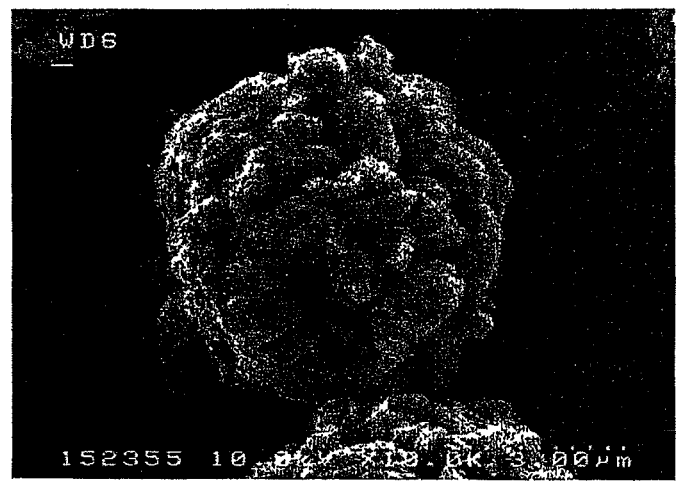
FIG. 1 shows a scanning electron microscope (SEM) photograph of a composite material for positive electrodes obtained in Example 1.

The composite material for positive electrodes of lithium batteries of the present invention (hereinafter, sometimes merely referred to as "composite material for positive electrodes") is a composite material for positive electrodes of lithium batteries including composite particles containing positive electrode active material particles and fibrous carbons. The positive electrode active material particles are supported by the fibrous carbons. Herein, "the positive electrode active material particles are supported by the fibrous carbon" means a state where the positive electrode active material particles contained in the composite particles are supported by the fibrous carbons to maintain the shapes of the composite particles. The state can be confirmed by a process described later.

It is considered that in the composite material for positive electrodes of the present invention, the positive electrode active material particles are supported by the fibrous carbons and therefore, a conductive network is constructed in all positive electrode active material particles, and the conductive network can provide a composite material for positive electrodes having very high conductivity. Further, it is considered that the entanglement of the fibrous carbons tends to form microscopic spaces, through which lithium ions can be smoothly diffused and therefore, the composite material for positive electrodes having excellent high rate electrical discharge characteristics can be provided. When a net made of the fibrous carbons wrap the positive electrode active material, the net has flexibility and therefore, the net can prevent collapse of a spherical structure caused by the crush of the structure in a press in producing an electrode. Accordingly, it is considered that the composite material for positive electrodes of the present invention can reduce the internal resistance of a battery as compared to that of the conventional one, and a lithium battery having excellent high rate electrical discharge characteristics can be provided.

That is, it is preferable that the composite particles of the composite material for positive electrodes of lithium batteries of the present invention have a form in which at least a part of the fibrous carbons exists in voids between the positive electrode active material particles. It is more preferable that the composite particles have a form in which a part of the fibrous carbons exists in the voids between the positive electrode active material particles and the fibrous carbons wrap the positive electrode active material particles in a mesh state. As shown in examples described later, such a form can be confirmed by scanning electron microscope observation.

As the positive electrode active material, any conventionally known materials can be used. Examples thereof include Li—Mn-based composite oxides such as $LiMn_2O_4$, Li—Co-based composite oxides such as $LiCoO_2$, Li—Ni-based composite oxides such as $LiNiO_2$, Li—Fe-based composite oxides such as $LiFeO_2$, and the like. The other examples include $Li_xCoO_2$, $Li_xNiO_2$, $MnO_2$, $LiMnO_2$, $Li_xMn_2O_4$, $Li_xMn_{2-y}O_4$, $\alpha$-$V_2O_5$, and $TiS_2$. Of these, from the viewpoints of excellent thermal stability, capacity and output characteristics, lithium manganates such as $Limn_2O_4$, lithium cobaltates such as $LiCoO_2$ and lithium nickelates such as $LiNiO_2$ are preferable, and lithium manganates such as $LiMn_2O_4$ are more preferable.

From the viewpoints of the safety, stability and cycle characteristics of the positive electrode active material, an average aggregated particle diameter of the positive electrode active material particles is preferably 0.1 µm or more, more preferably 0.3 µm or more, and still more preferably 0.5 µm or more. From the viewpoints of the reactivity and high rate electrical discharge characteristics thereof, it is preferably 10 µm or less, more preferably 5 µm or less, and still more preferably 2 µm or less. Collectively considering the viewpoints, the average aggregated particle diameter of the positive electrode active material particles is preferably 0.1 to 10 µm, more preferably 0.3 to 5 µm, and still more preferably 0.5 to 2 µm.

In the present invention, it is preferable that the positive electrode active material is supported by the fibrous carbons while the fibrous carbons are mutually entangled. From such a viewpoint, it is preferable that the fibrous carbon has a thin fiber diameter and a long fiber length. Furthermore, from the viewpoint of conductivity, an aspect ratio (L/W) of the fiber diameter (W) to the fiber length (L) of the fibrous carbon is preferably 50 or more, more preferably 100 or more, and still more preferably 200 or more. From the viewpoint of the dispersibility of the fibrous carbons, the aspect ratio thereof is preferably 20,000 or less, more preferably 5,000 or less, and still more preferably 1,000 or less. Collectively considering the viewpoints, the aspect ratio (L/W) is preferably 50 to 20,000, more preferably 100 to 5,000, and still more preferably 200 to 1,000.

From the same viewpoints, it is preferable that the fibrous carbons have a structure which is easily entangled. The fiber length of the fibrous carbon is preferably 50 nm or more, more preferably 500 nm or more, and still more preferably 1 µm or more. From the viewpoint of the smoothness of the surface of a positive electrode produced using the composite material for positive electrodes of the present invention, the fiber length of the fibrous carbon is preferably 50 µm or less, more preferably 30 µm or less, and still more preferably 10 µm or less. Collectively considering the viewpoints, the fiber length of the fibrous carbon is preferably 50 nm to 50 µm, more preferably 500 nm to 30 µm, and still more preferably 1 µm to 10 µm. From the viewpoint of supporting the positive electrode active material by the fibrous carbons, a ratio (the fiber length of the fibrous carbon/the particle diameter of the active material) of the fiber length of the fibrous carbon to the average aggregated particle diameter of the positive electrode active material particles (the particle diameter of the active material) is preferably 1 or more, more preferably 2 or more, and still more preferably 3 or more. From the same viewpoints, the ratio of the fiber length of the fibrous carbon to the particle diameter of the active material is preferably 500 or less, more preferably 100 or less more, and still more preferably 20 or less. Collectively considering the viewpoints, the ratio of the fiber length of the fibrous carbon to the particle diameter of the active material is preferably 1 to 500, more preferably 2 to 100, and still more preferably 3 to 20.

From the same viewpoints, from the viewpoints of the fibrous carbon preferably easily entangled, and of the fibrous carbon brought into contact with the surface of the positive electrode active material much more to establish a conductive passage, the fiber diameter of the fibrous carbon is preferably 1 to 1,000 nm, more preferably 1 to 500 nm, still more preferably 1 to 100 nm, and yet still more preferably 1 to 50 nm.

From the viewpoints of easily obtaining the suitable aspect ratio, fiber length and fiber diameter described above, and of granules, in which the positive electrode active material particles are supported by the fibrous carbons, being easily obtained by spray granulation (described later), as the fibrous carbons, fibrous carbons obtained from a polymer typified by polyacrylonitrile (PAN) as a raw material, and pitch-based fibrous carbons obtained from pitch as a raw material can be also used. Vapor phase epitaxy-based carbon fiber (for example, VGCF: registered trademark) that is a carbon nanotube (a cylindrical-shaped object ("Biryushi Kougaku Taikei, Volume I, 1st edition, pp. 651, Fujitec Corporation) formed by winding a sheet of graphite, i.e., a graphene sheet) and that is obtained from hydrocarbon gas as a raw material, and so-called a narrowly-defined carbon nanotube (hereinafter, the narrowly-defined carbon nanotube is merely referred to as carbon nanotube) obtained by an arc discharge method, a laser vaporizing method and a chemistry vapor growth method or the like are suitably used. The fibrous carbon having a thin fiber diameter is preferable from the viewpoint of constructing more conductive paths. The VGCF and the carbon nanotube are suitably used, and of these, the carbon nanotube is preferably used. The carbon nanotube can be obtained by, for example, an arc discharge method for vaporizing a graphite electrode by arc discharge under atmosphere gas such as He, Ar, $CH_4$ and $H_2$ an arc discharge method for vaporizing a graphite electrode including metal catalysts such as Ni, Co, Y, Fe by arc discharge, a laser vaporizing method for applying YAG laser to graphite with which metal catalysts such as Ni—Co and Pd—Rd are mixed to vaporize the graphite and sending out the graphite to an electric furnace heated at about 1200° C. by Ar current, and an HiPCO method for thermally decomposing carbon monoxide at a high pressure using pentacarbonyl iron ($Fe(CO)_5$) for a catalyst, or the like. Referring to the aspect ratio of the carbon nanotube, for example, the smaller the concentration ratio of hydrocarbon (benzene or the like) to atmosphere gas such as hydrogen gas is, the thinner the diameter of the carbon nanotube to be produced is, and the larger the aspect ratio is. Alternatively, the shorter the reaction time is, the thinner the diameter of the carbon nanotube to be produced is, and after all, the larger the aspect ratio is.

In the present invention, a carbon material subserving conductivity in addition to the fibrous carbons may be blended. Examples of such a carbon material include graphite and carbon black. Of these, carbon black is preferably used.

As the carbon black, there can be used one produced by any of decomposing methods such as a thermal black method and an acetylene black method, and incomplete combustion methods such as a channel black method, a gas furnace black method, an oil furnace black method, a pine resin black method and a lamp black method. However, from the viewpoint of conductivity, furnace black and acetylene black are preferably used. These may be used either alone or in combination with two or more thereof.

From the viewpoint of suitably subserving the conductivity of the fibrous carbon, a DBP absorption amount of carbon black is preferably 40 to 300 $cm^3/100$ g, and more preferably 80 to 200 $cm^3/100$ g.

When a carbon material other than the fibrous carbons is added, such a carbon material may be added into a dispersion liquid of the fibrous carbons, and the carbon material may be used together with the positive electrode active material particles and the fibrous carbons to be formed into a composite material. Particles obtained from the dispersion liquid of the fibrous carbons and the positive electrode active material by spray granulation, and the carbon material may be mixed with each other to be used in order to enhance the conductivity between the granules.

From the viewpoint of holding the shape of the granules while subserving conductivity, the blending amount of the carbon material other than the fibrous carbons is preferably 0 to 20 parts by weight, more preferably 0 to 10 parts by weight, and still more preferably 0 to 5 parts by weight based on 100 parts by weight of the positive electrode active material.

From the viewpoint of reducing the volume resistance of the composite material for positive electrodes, the total blending amount of the carbon material, that is, the total blending amount of the fibrous carbons and the carbon material other than the fibrous carbons is preferably 0.02 parts by weight or more, more preferably 0.1 parts by weight or more, and still more preferably 0.5 parts by weight or more based on 100 parts by weight of the positive electrode active material. From the viewpoint of enhancing the energy density of the composite material for positive electrodes, the total blending amount thereof is preferably 30 parts by weight or less, more preferably 20 parts by weight or less, and still more preferably 10 parts by weight or less. Collectively considering the viewpoints, the total blending amount of the fibrous carbons and the carbon material other than the fibrous carbons is preferably 0.02 to 30 parts by weight, more preferably 0.1 to 20 parts by weight, and still more preferably 0.5 to 10 parts by weight.

From the viewpoint of imparting sufficient conductivity to the positive electrode, the volume resistance of the composite material for positive electrodes of the present invention is preferably 0 to 3 Ω·cm, more preferably 0 to 2 Ω·cm, and still more preferably 0 to 1.5 Ω·cm.

In the composite material for positive electrodes of the present invention, microscopic pores are easily formed by voids between the entangled fibrous carbons or voids between the positive electrode active materials. When the microscopic pores are formed, the total of the pore volumes of 0.01 to 1 μm is preferably 0.3 ml/g or more, and more preferably 0.4 ml/or more from the viewpoint of the smooth movement of Li. From the viewpoint of reducing the addition amount of a binder, the total of the pore volumes of 0.01 to 1 μm is preferably 0.8 ml/g or less, and more preferably 0.6 ml/g or less.

Next, the process for producing the composite material for positive electrodes of lithium batteries of the present invention will be described. The process for producing the composite material for positive electrodes of lithium batteries of the present invention is a suitable process for producing the composite material for positive electrodes of lithium batteries of the present invention described above, and therefore, portions overlapping with the descriptions above are omitted.

The process for producing the composite material for positive electrodes of lithium batteries of the present invention is a process for producing the composite material for positive electrodes of lithium batteries, which includes composite particles containing positive electrode active material particles and fibrous carbons. The process includes following Steps 1 and 2. First, in Step 1, there is obtained a slurry containing a solvent, and positive electrode active material particles and fibrous carbons contained in a dispersed state in the solvent.

The following viewpoints are considered for the selection of the fibrous carbons. That is, in the present invention, it is preferable that the fibrous carbons in which respective fibers are entangled to be aggregated in a ball-like state are dispersed to be a dispersed state described later in the solvent (preferably, dispersed by using a dispersing agent), and the positive electrode active material is mixed therewith to form a slurry in which the fibrous carbons and the positive electrode active material particles are uniformly mixed, and the slurry is spray-dried to construct spherical composite particles having the positive electrode active material and the fibrous carbons. The fibrous carbons dispersed in the positive electrode active material are entangled when the spray granulation is carried out, and thereby the adjacent positive electrode active material is preferably supported by the fibrous carbons. More preferably, the positive electrode active material is supported in a wrapped state to form spherical particles. From such viewpoints, as the fibrous carbons, the same fibrous carbons as those of the composite material for positive electrodes of lithium batteries of the present invention described above can be used. Of these, VGCF and a carbon nanotube are suitably used, and the carbon nanotube is more preferably used.

From the viewpoint of reducing the volume resistance of a positive electrode material, the addition amount of the fibrous carbons in the slurry is preferably 0.01 parts by weight or more, more preferably 0.1 parts by weight or more, and still more preferably 0.5 parts by weight or more based on 100 parts by weight of the positive electrode active material. From the viewpoint of the coatability of the fibrous carbons to the surface of the positive electrode active material, the addition amount of the fibrous carbons is preferably 15 parts by weight or less, more preferably 10 parts by weight or less, and still more preferably 5 parts by weight or less. Collectively considering the viewpoints, the addition amount of the fibrous carbons in the slurry is preferably 0.01 to 15 parts by weight, more preferably 0.1 to 10 parts by weight, and still more preferably 0.5 to 5 parts by weight.

In the present invention, the composite material for positive electrodes is produced according to mainly, two steps, and preferably three steps.

First, as [Step 1], a slurry containing a solvent, and positive electrode active material particles and fibrous carbons contained in a dispersed state in the solvent is obtained. Herein, a state where the positive electrode active material particles and the fibrous carbons are dispersed means the following dispersed state. When the slurry is sampled and is diluted to a predetermined concentration, and an average particle diameter thereof is measured with a particle size distribution measuring device without delay, the average particle diameter is within 130% of an average aggregated particle diameter of the positive electrode active material (a specific measuring process will be described later). That is, an initial aggregated state is shifted to such a dispersed state, and whereby the average particle diameter to be measured approaches the average aggregated particle diameter of the positive electrode active material (the dispersed state of the fibrous carbons is also reflected by this measured value). The dispersed state can be grasped from this phenomenon.

As described above, as a process for forming a state where positive electrode active material particles and fibrous carbons are dispersed, a process for dispersing fibrous carbons in a solvent using a dispersing agent, adding a positive electrode active material, in some cases, a carbon material other than the fibrous carbons, and irradiating with ultrasonic waves can be exemplified.

Then, as [Step 2], the slurry obtained in Step 1 is subjected to spray granulation to obtain granules containing the positive electrode active material particles and the fibrous carbons. Preferably, so-called spray granulation is carried out. In the spray granulation, the slurry is sprayed to produce spherical droplets, and the solvent is then evaporated and dried with heat to form spherical granulated powder.

Furthermore, in or after Step 2, the dispersing agent is preferably removed from the granules to obtain composite particles in [Step 3] as an optional step.

A step of mixing a carbon material other than the fibrous carbons may be added in order to suitably construct conductive paths between the particles obtained in the three steps.

As the solvent used for dispersion in Step 1, N-methyl-2-pyrrolidone (NMP, boiling point: 202° C.), dimethylformamide (DMF, boiling point: 153° C.), dimethylacetamide (boiling point: 165° C.), water (boiling point: 100° C.), methyl ethyl ketone (boiling point: 79.5° C.), tetrahydrofuran (boiling point: 66° C.), acetone (boiling point: 56.3° C.), ethanol (boiling point: 78.3° C.), and ethyl acetate boiling point: 76.8° C.) and the like are suitably used. From the viewpoints of the cost and the easiness in dispersion of the fibrous carbons, water is preferably used.

From the viewpoints of sufficiently dispersing the fibrous carbons and of providing sufficient viscosity for carrying out the spray granulation of Step 2, the use amount of the solvent in Step 1 is preferably 60 parts by weight or more, more preferably 100 parts by weight or more, and still more preferably 200 parts by weight or more based on 100 parts by weight of the positive electrode active material. From the viewpoint of the productivity, the use amount thereof is preferably 3,000 parts by weight or less, more preferably 2,000 parts by weight or less, and still more preferably 1,500 parts by weight or less.

In Step 1, a dispersing agent can be also used. An anionic, nonionic or cationic surfactant, or a polymer dispersing agent can be used as the dispersing agent used in the case. The fibrous carbon is a microscopic carbon fiber having a diameter of 1,000 nm or less. However, it has a structure where the network of a carbon hexagonal net surface extends cylindrically. As the feature of the dispersing agent having good affinity with such a structure, a dispersing agent having an aromatic functional group and having a size and a shape resembling those of the carbon hexagonal net surface, and a dispersing agent having an alicyclic compound as a functional group unit are preferable since the dispersing agents have such characteristics as to be easily adsorbed to, particularly, the fibrous carbons. That is, it is preferable that the dispersing agent to be used has a functional group containing an aromatic ring and/or an aliphatic ring.

Various compounds can be used as the polymer dispersing agent. However, a polycarboxylic acid-based polymer dispersing agent having a plurality of carboxyl groups in a molecule, a polyamine-based polymer dispersing agent having a plurality of amino groups in a molecule, a polymer dispersing agent containing a plurality of amide groups in a molecule, and a polymer dispersing agent having a plurality of polycyclic aromatic compounds in a molecule are preferable.

Examples of the polycarboxylic acid-based polymer dispersing agent include poly(meth) acrylic acid and a derivative thereof. Specific examples of the derivative include a copolymer of (meth)acrylic acid and (meth)acrylic ester, a copolymer of (meth) acrylic acid and maleic anhydride, an amidated compound and esterified compound thereof, a copolymer of (meth)acrylic acid and maleic acid, and a comb-shaped polymer having a (meth)acrylic acid unit. Herein, (meth)acrylic acid means acrylic acid or methacrylic acid.

Examples of the polyamine-based polymer dispersing agent include polyalkyleneamine and a derivative thereof, polyallylamine and a derivative thereof, polydiallylamine and a derivative thereof, poly-N,N-dimethylaminoethylmethacrylate and a derivative thereof, and a comb-shaped polymer obtained by grafting a polyester to the polyamine.

Examples of the polymer dispersing agent having a plurality of amide groups in the molecule include polyamide obtained by a condensation reaction and a derivative thereof, polyvinylpyrrolidone and a derivative thereof, poly-N,N-dimethylacrylamide and a derivative thereof, and a comb-shaped polymer obtained by grafting a polyester and polyalkylene glycol to the polyamides.

Examples of the polymer dispersing agent containing a polycyclic aromatic compound include a copolymer of a vinyl monomer having a pyrene or quinacridone backbone and various monomers.

These dispersing agents can be used singly or in combination with two or more thereof. From the viewpoint of reducing the viscosity of the slurry while suitably dispersing the slurry, the suitable addition amount of the dispersing agent in cases where the dispersing agent is used is 0.05 to 20% by weight, and more preferably 0.05 to 10% by weight based on the slurry.

When the dispersing agent is left in the composite material for positive electrodes of the present invention, the dispersing agent itself may become a resistant component to suppress the high rate electrical discharge characteristics of the battery. Therefore, as in Step 3 described in detail later, the dispersing agent is preferably removed. A technique of removing the dispersing agent by washing and a technique of decomposing the dispersing agent by heat treatment are mainly used as a removing process. However, from such a viewpoint, a surfactant is preferably used as the dispersing agent which is easily washed. From the viewpoint of the surfactant preferably having such characteristics as to be completely decomposed by heat treatment and be vaporized without leaving counter ions, a nonionic surfactant is more preferable.

From the viewpoint of dispersing the fibrous carbons, the blending amount of the dispersing agent in Step 1 is preferably 1 part by weight or more, more preferably 5 parts by weight or more, and still more preferably 10 parts by weight or more based on 100 parts by weight of the fibrous carbon. From the viewpoint of reducing a load in a step of removing the dispersing agent of Step 3, the blending amount thereof is preferably 200 parts by weight or less, more preferably 150 parts by weight or less, and still more preferably 100 parts by weight or less. Collectively considering the viewpoints, the blending amount of the dispersing agent is preferably 1 to 200 parts by weight, more preferably 5 to 150 parts by weight, and still more preferably 10 to 100 parts by weight.

When a slurry containing the fibrous carbons is formed, the fibrous carbons are preferably disaggregated (preliminarily dispersed) prior to dispersing. That is, the fibrous carbons such as carbon nanofibers are generally aggregated into a ball-like state. However, it is preferable that the fibrous carbons are mechanically crushed to some extent to be disaggregated before the fibrous carbons are dispersed by the dispersing agent. A dry type pulverizer is preferably used for such prior disaggregation. Specific examples thereof include a process using impact type pulverizers such as a rotor speed mill and a hammer mill, dry type medium pulverizers such as a dry type tumbling ball mill, a dry type vibration ball mill, a dry type planet mill and a medium stirring mill, and air stream type pulverizers such as a jet mill. Of these, from the viewpoint of carrying out moderate pulverization, the process using impact type pulverizers such as a rotor speed mill and a hammer mill is preferable.

The fibrous carbons are preferably dispersed in the solvent using the dispersing agent in Step 1. However, at this time, it is more preferable that the fibrous carbons are forcibly dispersed using a disperser while adding the dispersing agent into the slurry, or before or after adding the dispersing agent into the slurry, and preferably after adding the dispersing agent into the slurry, in order to promote the dispersion. Examples of the disperser include an ultrasonic wave type disperser, a stirring type disperser, a high speed rotating shear type disperser, a mill type disperser, and a high-pressure jetting type disperser, and the ultrasonic wave type disperser and the high-pressure jetting type disperser are suitably used when being used for the step of forcibly dispersing the fibrous carbons.

The fibrous carbons are dispersed in the solvent in Step 1. However, from the viewpoint of loosening the fibrous carbons to single fibers, an average aggregated particle diameter of the fibrous carbons at this time is preferably 0.1 to 40 μm, more preferably 0.1 to 10 μm, and still more preferably 0.1 to 5 μm.

From the viewpoint of enhancing the productivity of the spray granulation of the next step, the solid content concentration (the positive electrode active material+the fibrous carbons+the other carbon material+the dispersing agent) of the slurry obtained in Step 1 is preferably 1% by weight or more, more preferably 2% by weight or more, and still more preferably 5% by weight or more. From the viewpoint of adjusting the particle diameter of the granules obtained in Step 2 to a preferred range, the solid content concentration thereof is preferably 60% by weight or less, 50% by weight or less, and still more preferably 40% by weight or less. Collectively considering the viewpoints, the solid content concentration of the slurry is preferably 1 to 60% by weight, more preferably 2 to 50% by weight, and still more preferably 5 to 40% by weight. From the viewpoint of controlling the particle diameter of the granules obtained in Step 2 to a preferred range, the viscosity of the slurry obtained in Step 1 is preferably 5,000 mPa·s or less, more preferably 1,000 mPa·s or less, and still more preferably 100 mPa·s or less.

In Step 2, the slurry obtained in Step 1 is subjected to the spray granulation. However, as a process of the spray granulation, a so-called spray drying process for producing droplets of a slurry using a nozzle and an atomizer or the like and drying the droplets in an extremely short time can be used. In addition, processes such as a spray freeze drying process for freezing the droplets in a short time and then drying the droplets under reduced pressure or the like, and a spray thermal decomposition process combining spray drying and calcining can be used. Of these, the spray drying process is preferable.

In Step 2, it is preferable that the droplets obtained by spraying are dried at a temperature at which the fibrous carbons and the other carbon material are not burned. Specifically, the temperature of the droplets to be dried is preferably 400° C. or less, and more preferably 300° C. or less.

From the viewpoints of enhancing the insertion/desorption ability of Li and of maintaining the smoothness of a coating film, an average aggregated particle diameter of the granules in Step 2 is preferably 20 μm or less, more preferably 15 μm or less, and still more preferably 10 μm or less. From the viewpoint of reducing the amount of a binder in producing the coating film as the positive electrode of a battery, an average aggregated particle diameter thereof is preferably 1 μm or more, more preferably 3 μm or more, and still more preferably 5 μm or more. Collectively considering the viewpoints, the average aggregated particle diameter of the granules is preferably 1 to 20 μm, more preferably 3 to 15 μm, and still more preferably 5 to 10 μm.

Step 3 is effective when the particles obtained in Step 2 contain the dispersing agent added in order to disperse the fibrous carbons. When the dispersing agent is left, the dispersing agent becomes a resistant component not only to suppress the high rate electrical discharge characteristics of the battery, but also to be a factor of generating a gas or lowering charging/discharging cycle characteristics due to its decomposition in the battery. Therefore, it is necessary to remove the left dispersing agent. This process is Step 3.

Specific examples of a technique for this process include two techniques. One technique is (1) a process for washing a dispersing agent using a solvent capable of dissolving the dispersing agent to remove the dispersing agent, and the other is (2) a process for decomposing and vaporizing a dispersing agent by heat treatment to remove the dispersing agent. The process (1) is preferable since it can be applied to almost all dispersing agents. The process (2) is preferable since it has high productivity at a low cost as compared to the process (1).

From the viewpoint of efficiently decomposing the dispersing agent, when the dispersing agent is removed by heat treatment (the technique (2)) in Step 3, a heating temperature is preferably 100° C. or more, and more preferably 150° C. or more. From the viewpoint of preventing the fibrous carbons from being decomposed, the heating temperature is preferably 400° C. or less, and more preferably 300° C. or less.

The shape of the composite material for positive electrodes obtained in Steps 1 to 3 is a spherical shape. Only a perfect spherical shape is not necessarily obtained. Spherical shapes having a particle form capable of being obtained in the spray granulation can be obtained. Examples thereof include a spherical shape having a slightly uneven particle surface, a spherical shape wholly distorted in some degree, a partially dented or lacked spherical shape, and a spherical shape formed by the combination of some spherical particles to be aggregated. When the composite material for positive electrodes contains carbon fibers having a large fiber diameter as the fibrous carbons, one showing a form in which the carbon fibers are projected from the surface of the spherical particle can be obtained.

From the viewpoint of reducing the amount of a binder in producing a coating film as the positive electrode of a battery, an average aggregated particle diameter of the composite particles obtained through Step 3 is preferably 1 μm or more, more preferably 3 μm or more, and still more preferably 5 μm or more. From the viewpoint of the surface properties of the positive electrode obtained using the composite particles, the average aggregated particle diameter thereof is preferably 20 μm or less, more preferably 15 μm or less, and still more preferably 10 μm or less. Collectively considering the viewpoints, the average aggregated particle diameter of the composite particles is preferably 1 to 20 μm, more preferably 3 to 15 μm, and still more preferably 5 to 10 μm.

The positive electrode of lithium batteries of the present invention contains the composite material for positive electrodes and the binder. The lithium battery of the present invention includes a positive electrode containing the composite material for positive electrodes and the binder. That is, the other constituent requirements of the positive electrode of lithium batteries and the lithium battery of the present invention are not limited at all as long as the composite material for positive electrodes is used as the positive electrode material. For example, as the binder, conventional binders such as polyvinylidene fluoride, polyamide imide, polytetrafluoroethylene, polyethylene, polypropylene and polymethylmethacrylate can be used.

The application of the battery using the composite material for positive electrodes of the present invention is not particularly limited. For example, the battery can be used for electronic devices such as a laptop PC, an electronic book player, a DVD player, a portable audio player, a video movie, a portable television and a portable phone. In addition, the battery can be used for consumer devices such as a cordless cleaner, a cordless power tool, a battery for electric vehicles, hybrid vehicles or the like, and an auxiliary power for fuel cell vehicles. Of these, the battery is suitably used as a battery for vehicles particularly requiring high output.

EXAMPLES

Hereinafter, examples or the like specifically showing the present invention will be described. Evaluation items in the examples or the like were measured as follows.
(1) DBP Absorption Amount
The DBP absorption amount was measured based on JIS_K 6217-4.
(2) Average Aggregated Particle Diameter
A laser diffraction/scattering type particle size distribution measuring device LA 920 (manufactured by Horiba, Ltd.) was used. Water was used as a dispersion medium. A value of a volume median particle diameter (D50) when particle size distribution after ultrasonic wave irradiation for 3 minutes was measured at a relative refractive index of 1.5 was defined as average aggregated particle diameters of fibrous carbons and carbon black, and average aggregated particle diameters of a positive electrode active material, granules in Step 2 and composite particles obtained through Step 3.
(3) Primary Particle Diameter of Carbon Black
50 primary particles were extracted from a SEM image photographed by a field emission type scanning electron microscope (S-4000, manufactured by Hitachi, Ltd.) in a magnification of 10,000 to 50,000, and the average value of the diameters thereof was defined as a primary particle diameter. The diameter is a value calculated by (a long axial diameter+a short axial diameter)/2. When the SEM image of the carbon black to which attention is directed is sandwiched between two parallel lines and a distance between the parallel lines is minimum, the distance is defined as the short axial diameter. When the SEM image of the carbon black is sandwiched between two parallel lines in a direction perpendicular to the parallel lines, a distance between the parallel lines is defined as the long axial diameter.
(4) Fiber Diameter and Fiber Length of Fibrous Carbon
30 fibrous carbons were extracted from a SEM image photographed by the field emission type scanning electron microscope (S-4000, manufactured by Hitachi, Ltd.) in a magnification of 2,000 to 5,000. The average value of lengths of line segments measured as follows was defined as a fiber diameter. The average value of the lengths of the fibers was defined as a fiber length. Herein, the length of the line segment means a length of a line segment obtained by cutting a normal line of one of two curves drawn by the profile of the image of each of the thirty fibrous carbons in the longitudinal direction by the two curves.
(5) Aspect Ratio of Fibrous Carbon
An aspect ratio of the fibrous carbon was obtained by dividing the fiber length of the fibrous carbon by the fiber diameter.
(6) Volume Resistivity
The values of a powder sample amount and a pressure in powder compression were respectively changed to 0.3 g and 100 kg/cm$^2$ based on JIS K 1469, and the electric resistance values of cylindrically compressed powder samples were measured. The volume resistivities (electric resistivities) were calculated by the following formula I from the measured resistance values. Specifically, a cylindrical container which includes an insulative cylinder (made of bakelite, outer diameter: 28 mm, inner diameter: 8 mm) and a (minus) electrode was filled with 0.3 g of a powder sample. A (plus) electrode was inserted into the insulative cylindrical container filled with the sample to sandwich the powder sample between the (minus) electrode and the (plus) electrode. The cylindrical container was provided on a pressing machine mount. A force of 100 kg/cm² was applied to the sample in the cylindrical container by a pressing machine to compress the sample. The (plus) electrode and the (minus) electrode were connected to input measuring cables of a digital multi-meter. The electric resistance value was measured after an elapse of three minutes since the initiation of compression.

$$\rho = S/h \times R \quad \text{(formula 1)}$$

Wherein $\rho$ is an electric resistivity ($\Omega\cdot$cm); S is a cross section area (cm²) of a sample; and h is a filling height (cm) of the sample; and R is an electric resistance value ($\Omega$).

The used (minus) electrode, which was made of brass of a battery grade, had an electrode surface having a diameter of 7.8±1 mm, and was a pedestal-shaped electrode having a projection part having a height of 5 mm. The (plus) electrode, which was made of brass of a battery grade, had an electrode surface having a diameter of 7.8±1 mm, and was a rod-shaped electrode having a length of 60 mm.

(7) Pore Volume

The total of pore volumes of 0.01 μm to 1 μm was measured using a mercury injection pore size distribution measuring device (Poresizer 9320, manufactured by Shimadzu Corporation), and the obtained value was defined as a pore volume.

(8) Process for Confirming Dispersed State in Solvent 120 mL of the same solvent as that of a slurry was added into a laser diffraction/scattering type particle size distribution measuring device LA 920 (manufactured by Horiba, Ltd.), and stirred and circulated (circulation level 4). The sampled slurry (the slurry containing a solvent, and positive electrode active material particles and fibrous carbons contained in the solvent) was dropped thereto. A slurry concentration was adjusted so that the transmissivity of laser in a cell of the device was set to a range of 75% to 95%. The particle size distribution after being irradiated with ultrasonic waves for 3 minutes at a memory 7 of the device was measured at a relative refractive index of 1.5. A ratio is calculated by dividing the volume median particle diameter (D50) at this time by the average aggregated particle diameter of the positive electrode active material measured on the condition of the item (2) and multiplying the obtained value by 100. In the present invention, a state where the ratio is within 130% is defined as a dispersed state.

(9) Process for Confirming State where Positive Electrode Active Material Particles are Supported by Fibrous Carbons One composite particle having the positive electrode active material and the fibrous carbons was heated at 600° C. for 1 hour. At this time, when the composite particle is collapsed to be a plurality of composite particles, or is collapsed to be positive electrode active material particles in which the fibrous carbons disappear mostly, the positive electrode active material particles in the composite particle are defined as being supported by the fibrous carbons. That is, the composite particles heated at 600° C. for 1 hour are photographed by the field emission type scanning electron microscope (S-4000, manufactured by Hitachi, Ltd.), and a SEM image of 1,000 to 50,000 magnification is visually observed. As a result of the observation, in the following cases, the positive electrode active material particles are defined as being supported by the fibrous carbons: a case where only the positive electrode active material particles in which the fibrous carbons disappear mostly are observed; a case where only the composite particles in which the fibrous carbons are entangled with the positive electrode active material particles are observed; and a case where both the positive electrode active material particles in which the fibrous carbons disappear mostly and the composite particles in which the fibrous carbons are entangled with the positive electrode active material particles are observed. On the other hand, when the positive electrode active material particles in which the fibrous carbons disappear mostly and the particles of the aggregated fibrous carbons are observed, the positive electrode active material particles are defined as being unsupported by the fibrous carbons.

(10) Production of Battery

A composite material for positive electrodes, carbon black, and an N-methylpyrrolidone solution of 12% by weight polyvinylidene fluoride (PVDF), and N-methylpyrrolidone were uniformly mixed at blending ratios shown in Table 2 to prepare a coating paste. The paste was uniformly coated (0.009 g/cm² after drying) on an aluminum foil (thickness: 20 μm) used as a current collector by a coater (a YBA type baker applicator), and dried at 80° C. over 12 hours or more under reduced pressure (100 to 300 mmHg). After drying, the dried body was cut to a predetermined size (20×15 mm), and was molded to a uniform film thickness by a pressing machine so that the entire thickness including the aluminum foil was set to 55 μm to produce a test positive electrode.

10 parts by weight of hard carbon, 9.3 parts by weight of an N-methylpyrrolidone solution of 12% by weight polyvinylidene fluoride (PVDF), and 8.5 parts by weight of N-methylpyrrolidone were uniformly mixed to prepare a coating paste. The paste was uniformly coated on a copper foil (thickness: 18 μm) used as a current collector by a coater (a YBA type baker applicator), and dried at 80° C. over 12 hours or more under reduced pressure (100 to 300 mmHg). After drying, the dried body was cut to a predetermined size (20×15 mm), and was molded to a uniform film thickness by a pressing machine to produce a test negative electrode. At this time, the thickness of a negative electrode layer was set to 25 μm. Celgard #2400 (manufactured by Celgard) was used for a separator. A solution of ethylene carbonate:diethyl carbonate (1:1 vol %) in 1 mol/L LiPF$_6$ was used for an electrolytic solution. A test cell was assembled in a glove box under an argon atmosphere. After being assembled, the test cell was left at 25° C. for 24 hours. The internal resistance characteristics of the test cell were then evaluated.

(11) Evaluation of Internal Resistance Characteristics

The internal resistances of lithium ion secondary batteries obtained in Examples 3 and 4, and Comparative Example 1 described later were evaluated. First, the lithium ion secondary batteries were charged to 4.0 V under a constant current at 0.2 C, and were then charged at a constant potential of 4.0 V for 1 hour to adjust the charging state of each of the batteries to about 60% of full charge. The batteries were discharged at a constant current value of 5 C for 30 seconds to measure a potential drop value. The internal resistances of the obtained lithium ion secondary batteries were evaluated using a value obtained by dividing this potential drop value by a discharge current value as the internal resistance value of the battery. Table 2 shows the relative values of the internal resistance values of Examples 3 and 4 when the internal resistance value of Comparative Example 1 is defined as 100.

Example 1

0.375 parts by weight of a nonionic dispersing agent (emulgen A-90, manufactured by Kao Corporation) having a phenyl group as a functional group was added to, and dissolved in 100 parts by weight of water. 0.375 parts by weight of carbon nanotubes having a fiber diameter of 20 nm, a fiber length of 5 μm and an aspect ratio of 250 was added to the solution, and was ultrasonically dispersed until the average aggregated particle diameter of the carbon nanotubes was set to 3 μm. 0.15 parts by weight of carbon black having an average aggregated particle diameter of 2 μm (primary particle diameter: 25 nm) and a DBP absorption amount of 155 $cm^3/100$ g was added to the carbon nanotube dispersion liquid while the liquid was irradiated with ultrasonic waves for 1 minute. 7.5 parts by weight of lithium manganate having an average aggregated particle diameter of 1.2 μm was then added thereto. Furthermore, dispersion was carried out by the ultrasonic waves for 2 minutes. The obtained dispersion liquid was spray-dried using a spray dryer (SD-1000, manufactured by Tokyo Rikakiki Co., Ltd.) at a hot air temperature of 135° C. 6 g of the obtained granulated powder was placed in a cylindrical filter paper, and was extracted by 400 ml of ethanol in a soxlet extraction machine for 8 hours to remove the dispersing agent left in the granulated powder. The obtained composite material for positive electrodes is shown in FIG. 1, and the physical properties thereof are shown in Table 1. When the obtained composite material for positive electrodes was confirmed by the process shown in the item (9), the composite material includes composite particles in which the positive electrode active material particles were supported by the carbon nanotubes. More specifically, as shown in FIG. 1, the composite material for positive electrodes had a form in which the carbon nanotubes exist in voids between the positive electrode active material particles and the carbon nanotubes wrap the positive electrode active material particles in a mesh state.

Example 2

Figure 2:
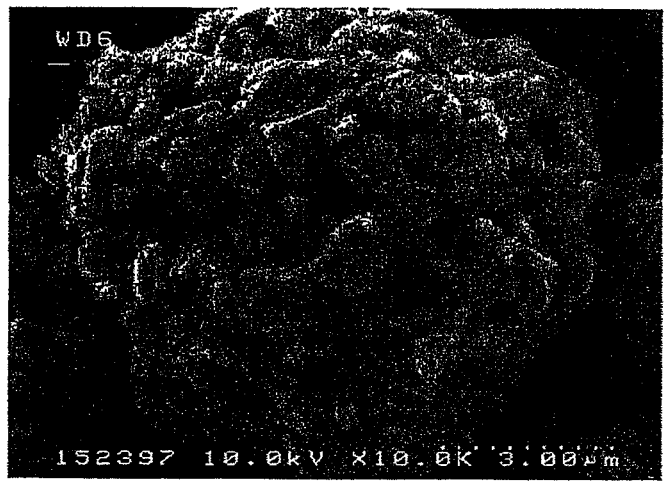
FIG. 2 shows a scanning electron microscope (SEM) photograph of a composite material for positive electrodes obtained in Example 2.

1.5 g of granulated powder obtained by spray-drying in the same manner as in Example 1 and containing a dispersing agent was heated in an electric furnace at 200° C. for 10 hours to decompose and vaporize the dispersing agent to be removed. The obtained composite material for positive electrodes is shown in FIG. 2, and the physical properties thereof are shown in Table 1. When the obtained composite material for positive electrodes was confirmed by the process shown in the item (9), the composite material composite material includes composite particles in which the positive electrode active material particles were supported by the carbon nanotubes. More specifically, as shown in FIG. 2, the composite material for positive electrodes had a form in which the carbon nanotubes exist in voids between the positive electrode active material particles and the carbon nanotubes wrap the positive electrode active material particles in a mesh state.

Example 3

Figure 3:
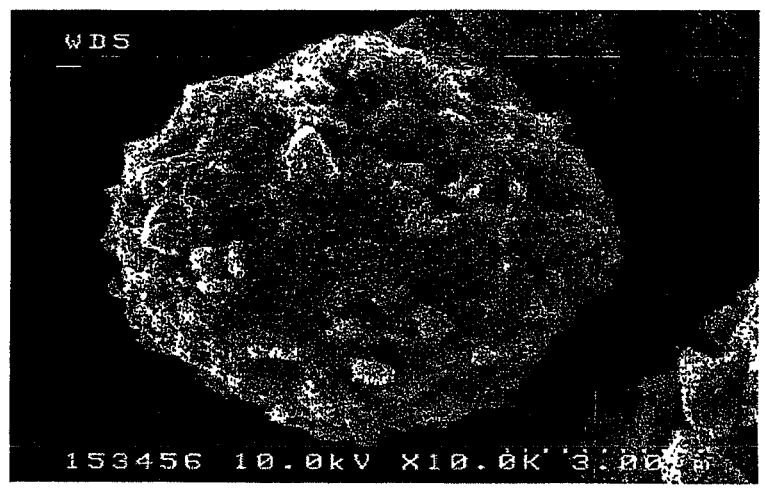
FIG. 3 shows a scanning electron microscope (SEM) photograph of a composite material for positive electrodes obtained in Example 3.

A composite material for positive electrodes was obtained in the same manner as in Example 1 except that the use amount of the nonionic dispersing agent having the phenyl group as the functional group was set to 0.15 parts by weight and the use amount of the carbon nanotubes was set to 0.15 parts by weight. The obtained composite material for positive electrodes, the physical properties thereof, and the internal resistance in producing a battery are shown in FIG. 3, Table 1 and Table 2, respectively. When the obtained composite material for positive electrodes was confirmed by the process shown in the item (9), the composite material includes composite particles in which the positive electrode active material particles were supported by the carbon nanotubes. More specifically, as shown in FIG. 3, the composite material for positive electrodes had a form in which the carbon nanotubes exist in voids between the positive electrode active material particles and the carbon nanotubes wrap the positive electrode active material particles in a mesh state.

Example 4

Figure 4:
FIG. 4 shows a scanning electron microscope (SEM) photograph of a composite material for positive electrodes obtained in Example 4.

A composite material for positive electrodes was obtained in the same manner as in Example 1 except that VGCFs (0.225 parts by weight) having a fiber diameter of 120 nm, a fiber length of 10 μm and an aspect ratio of 83 were used instead of the carbon nanotubes, and the use amount of the dispersing agent was set to 0.225 parts by weight. The obtained composite material for positive electrodes, the physical properties thereof, and the internal resistance in producing a battery are shown in FIG. 4, Table 1 and Table 2, respectively. When the obtained composite material for positive electrodes was confirmed by the process shown in the item (9), the composite material includes composite particles in which the positive electrode active material particles were supported by the VGCFs. More specifically, as shown in FIG. 4, the composite material for positive electrodes had a form in which the VGCFs exist in voids between the positive electrode active material particles and the VGCFs wrap the positive electrode active material particles in a mesh state.

Comparative Example 1

A composite material for positive electrodes was obtained in the same manner as in Example 1 except that 0.375 parts by weight of carbon black was used instead of using 0.375 parts by weight of the carbon nanotubes to set the total amount thereof to 0.525 parts by weight. The physical properties of the obtained composite material for positive electrodes and the internal resistance in producing a battery are shown in Table 1 and Table 2, respectively.

Comparative Example 2

A composite material for positive electrodes was obtained in the same manner as in Example 1 except that carbon nanotubes, carbon black and lithium manganate of the same amounts as those of Example 1 without adding the dispersing agent were mixed by a magnetic stirrer to prepare a slurry. The physical properties of the obtained composite material for positive electrodes are shown in Table 1. In Examples 1 to 4, for the state of the dispersion liquid before spray-drying, each of the ratios obtained by the process shown in the item (8) was within 130%. However, the ratio of Comparative Example 2 was 400%, and it could not be said to be in a dispersed state. When the composite material for positive electrodes of Comparative Example 2 was confirmed by the process shown in the item (9), one composite particle was collapsed to be positive electrode active material particles in which the fibrous carbons disappeared mostly and particles of the aggregated fibrous carbons. Therefore, it was not a composite particle in which the positive electrode active material particles were supported by the fibrous carbons (carbon nanotubes).

TABLE 1

| | Composition of slurry in Step 1 | | | | | | | | |
|---|---|---|---|---|---|---|---|---|---|
| | Solvent (water) | Positive electrode active material | | Fibrous carbon | | Dispersing agent | Other carbon material (carbon black) | Producing conditions in Steps 2 and 3 | |
| | Blending amount Part by weight | Average aggregated particle diameter μm | Blending amount Part by weight | Name | Blending amount Part by weight | Blending amount Part by weight | Blending amount Part by weight | Process for dispersion | Dispersed state |
| Example 1 | 100 (1333) | 1.2 | 7.5 (100) | CNT | 0.375 (5) | 0.375 (5) | 0.15 (2) | Ultrasonic wave | ≦130% |
| Example 2 | 100 (1333) | 1.2 | 7.5 (100) | CNT | 0.375 (5) | 0.375 (5) | 0.15 (2) | Ultrasonic wave | ≦130% |
| Example 3 | 100 (1333) | 1.2 | 7.5 (100) | CNT | 0.15 (2) | 0.15 (2) | 0.15 (2) | Ultrasonic wave | ≦130% |
| Example 4 | 100 (1333) | 1.2 | 7.5 (100) | VGCF | 0.225 (3) | 0.225 (3) | 0.15 (2) | Ultrasonic wave | ≦130% |
| Comparative Example 1 | 100 (1333) | 1.2 | 7.5 (100) | — | 0 (0) | 0.375 (5) | 0.525 (7) | Ultrasonic wave | ≦130% |
| Comparative Example 2 | 100 (1333) | 1.2 | 7.5 (100) | CNT | 0.375 (5) | 0 (0) | 0.15 (2) | Magnetic stirrer | 400% |

| | Producing conditions in Steps 2 and 3 | | Physical properties of composite material for positive electrode | | |
|---|---|---|---|---|---|
| | Process for granulation | Process for removing dispersing agent | Average aggregated particle diameter μm | Volume resistance Ω·cm | Pore volume of 0.01 to 1 μm ml/g |
| Example 1 | Spray granulation | Soxlet washing | 10 | 1.2 | 0.51 |
| Example 2 | Spray granulation | Heat treatment | 7 | 1.2 | 0.48 |
| Example 3 | Spray granulation | Soxlet washing | 13 | 1.5 | 0.41 |
| Example 4 | Spray granulation | Soxlet washing | 4 | 2 | 0.43 |
| Comparative Example 1 | Spray granulation | Soxlet washing | 6 | 6.5 | 0.25 |
| Comparative Example 2 | Spray granulation | Soxlet washing | 5.5 | 3.7 | 0.34 |

CNT: carbon nanotube
part by weight in parentheses: part by weight based on 100 parts by weight of positive electrode active material

TABLE 2

| | Paste composition in producing battery | | | | |
|---|---|---|---|---|---|
| | Composite material for positive electrodes, blending amount of active component Part by weight | Carbon black, blending amount of active component Part by weight | PVDF, blending amount of active component Part by weight | NMP (total amount), blending amount of active component Part by weight | Physical properties of battery Internal resistance |
| Example 3 | 10.4 | 0.85 | 1.25 | 23.2 | 96 |
| Example 4 | 10.5 | 0.75 | 1.25 | 23.2 | 95 |
| Comparative Example 1 | 10 | 1.25 | 1.25 | 23.2 | 100 |

As shown in the result of Table 1, the composite materials for positive electrodes of lithium batteries of Examples 1 to 4 have small volume resistance and sufficient pore volumes, and therefore, it is considered that lithium ions are smoothly moved in discharging the battery. As shown in the result of Table 2, the internal resistance of the battery could be further reduced as characteristics in producing the battery.

On the other hand, the composite material for positive electrodes of lithium batteries (Comparative Example 1) obtained without using the fibrous carbons had great volume resistance and an inadequate pore volume, and the internal resistance value in producing the battery was great. Since the positive electrode active material particles were not supported by the carbon nanotubes in the composite material for positive electrodes of lithium batteries (Comparative Example 2) obtained by spray granulation using the slurry containing the insufficiently dispersed fibrous carbons, the composite material had great volume resistance.

The invention claimed is:

1. A process for producing a composite material for positive electrodes of lithium batteries, which comprises composite particles containing positive electrode active material particles and fibrous carbons, the process including:
    Step 1 of obtaining a slurry containing a solvent, and the positive electrode active material particles and the fibrous carbons contained in a dispersed state in the solvent; and
    Step 2 of subjecting the slurry obtained in Step 1 to spray granulation to obtain granules containing the positive electrode active material particles and the fibrous carbons,
    wherein the slurry further contains a dispersing agent in Step 1,
    the positive electrode active material particles are supported by the fibrous carbons in the granules obtained in Step 2, and
    further comprising Step 3 of removing the dispersing agent from the granules in or after Step 2 to obtain composite particles,
    wherein Step 3 is a step of washing the granules with a solvent capable of dissolving the dispersing agent to remove the dispersing agent, thereby obtaining composite particles.

2. The process for producing a composite material for positive electrodes of lithium batteries according to claim 1, wherein an average aggregated particle diameter of the positive electrode active material is 0.1 to 10 µm.

3. The process for producing a composite material for positive electrodes of lithium batteries according to claim 1, wherein a fiber diameter of the fibrous carbon is 1 to 1,000 nm.

4. The process for producing a composite material for positive electrodes of lithium batteries according to claim 1, wherein the fibrous carbon is a carbon nanotube.

5. The process for producing a composite material for positive electrodes of lithium batteries according to claim 1, wherein the dispersing agent has a functional group containing an aromatic ring and/or an aliphatic ring.

6. The process for producing a composite material for positive electrodes of lithium batteries according to claim 1, wherein an ultrasonic wave type disperser is used in Step 1.

7. The process for producing a composite material for positive electrodes of lithium batteries according to claim 1, wherein in Step 1, the dispersed state, where the positive electrode active material particles and the fibrous carbons are, dispersed, means a state where a ratio calculated by dividing the volume median particle diameter (D50) of the slurry by particle size distribution measurement by the average aggregated particle diameter of the positive electrode active material and multiplying the obtained value by 100 is within 130%.

8. The process for producing a composite material for positive electrodes of lithium batteries according to claim 1, wherein an aspect ratio of the fibrous carbon 200 to 2000.

9. The process for producing a composite material for positive electrodes of lithium batteries according to claim 1, wherein the fiber length of the fibrous carbon is 1 to 10 µm.

10. The process for producing a composite material for positive electrodes of lithium batteries according to claim 1, wherein in Step 1, the blending amount of the dispersing agent is 10 to 200 parts by weight based on 100 parts by weight of the fibrous carbon.

* * * * *